DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 5, 1976

951 O.G. 6

T951,001

SULFUR PURIFICATION

Anthony G. Fonseca, Ponca City, Okla., and Richard L. Every, Metairie, La., assignors to Continental Oil Company, Ponca City, Okla.

Continuation of application Ser. No. 408,686, Oct. 23, 1973. This application Mar. 21, 1975, Ser. No. 560,904

Int. Cl.[2] C01B *17/14*

U.S. Cl. 423—578 R

No Drawing. 9 Pages Specification

A method for purifying hydrocarbon contaminated sulfur by (a) mixing a light hydrocarbon solvent with the hydrocarbon contaminated sulfur;

(b) separating the sulfur from the solvent;

(c) mixing water with the sulfur to form a sulfur-water mixture;

(d) heating the sulfur-water mixture to a temperature above the melting point of the sulfur; and (e) recovering purified sulfur from the sulfur-water mixture.